(12) United States Patent
Sasagawa

(10) Patent No.: US 6,246,433 B1
(45) Date of Patent: Jun. 12, 2001

(54) FILM IMAGE CAPTURING METHOD

(75) Inventor: Mikio Sasagawa, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/034,285

(22) Filed: Mar. 4, 1998

(30) Foreign Application Priority Data

Mar. 4, 1997 (JP) .................................. 9-048752

(51) Int. Cl.$^7$ ............................ H04N 5/253; H04N 1/00; H05B 37/04

(52) U.S. Cl. ............................... 348/96; 348/97; 315/134; 358/406

(58) Field of Search ........................ 348/96, 97; 382/319; 315/134; 358/406

(56) References Cited

U.S. PATENT DOCUMENTS 5,153,745 * 10/1992 Brandkamp et al. ............... 358/406
5,336,976 * 8/1994 Webb et al. ........................ 315/134

FOREIGN PATENT DOCUMENTS 8336071   12/1996   (JP) .

* cited by examiner

Primary Examiner—Chris Kelley
Assistant Examiner—Allen Wong
(74) Attorney, Agent, or Firm—Birch, Stewart, Kolasch & Birch, LLP

(57) ABSTRACT

A film image capturing method of reading a continuous developed film with a line sensor. This method comprises the steps of: pre-scanning for determining exposed conditions, including brightness, of each of the plurality of frames on the film; index scanning for capturing rough image data from each of the plurality of frames on the film under capturing conditions being adjusted according to the exposed conditions of the frame which are determined in the pre-scanning, and producing an index image showing all or selected frames of the plurality of frames on the film; main scanning for capturing fine image data from a desired frame of the plurality of frames on the film under the capturing conditions being adjusted according to the exposed conditions of the desired frame which are determined in at least one of the pre-scanning and the index scanning. The index scanning is enabled before the light source which illuminates the film reaches a predetermined stable state required for the main scanning, such that the index image can be displayed at an early stage.

20 Claims, 7 Drawing Sheets

F I G. 3
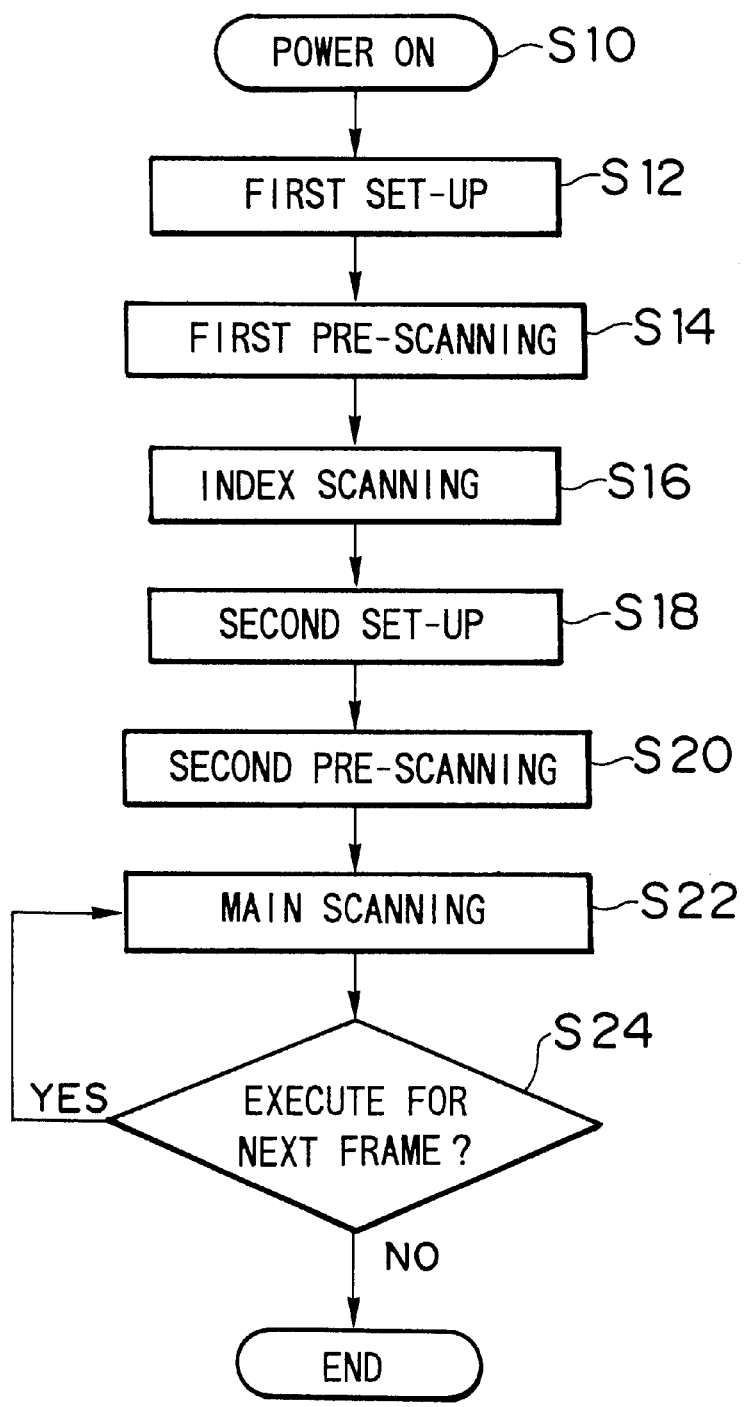

F I G. 4
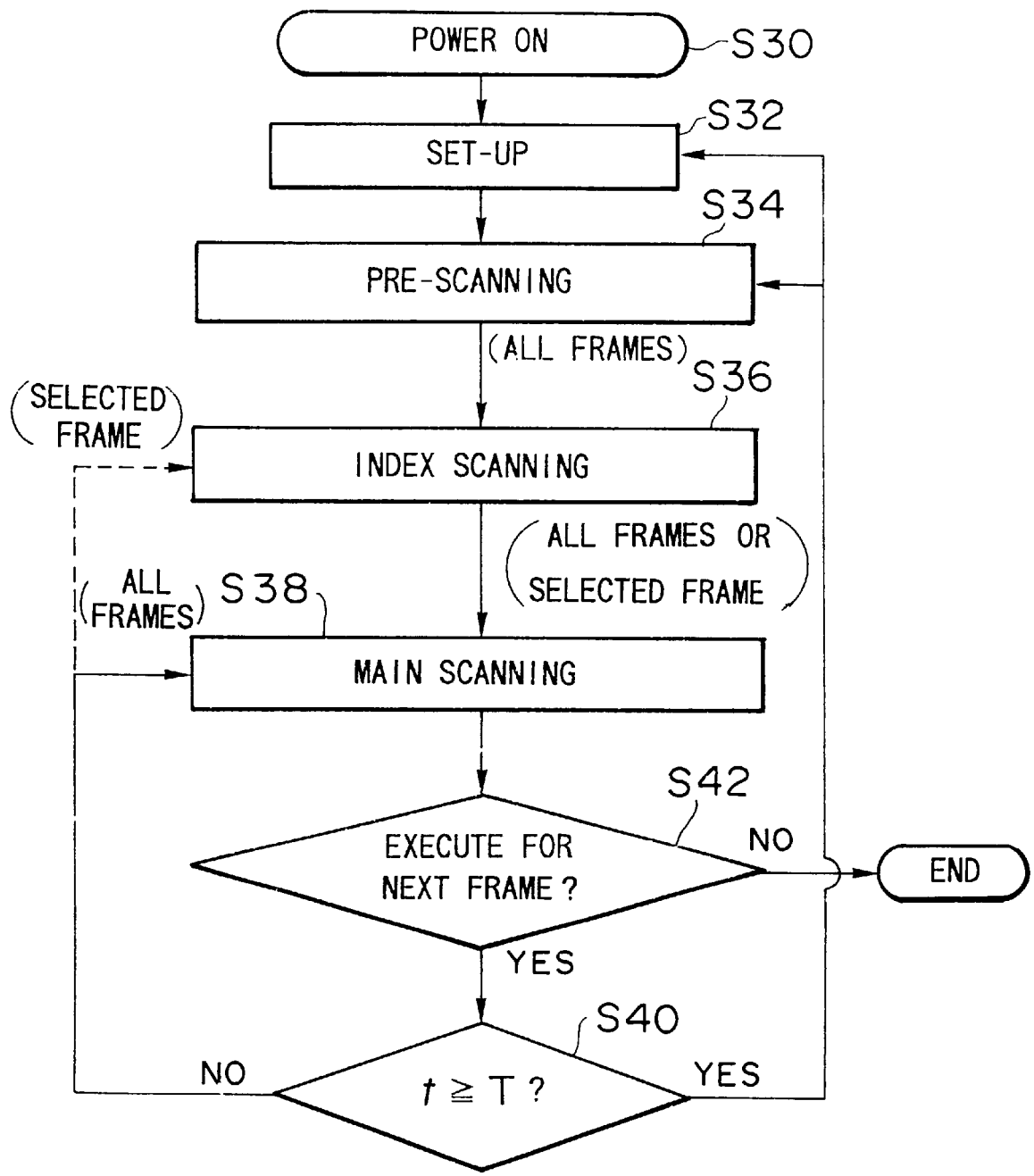

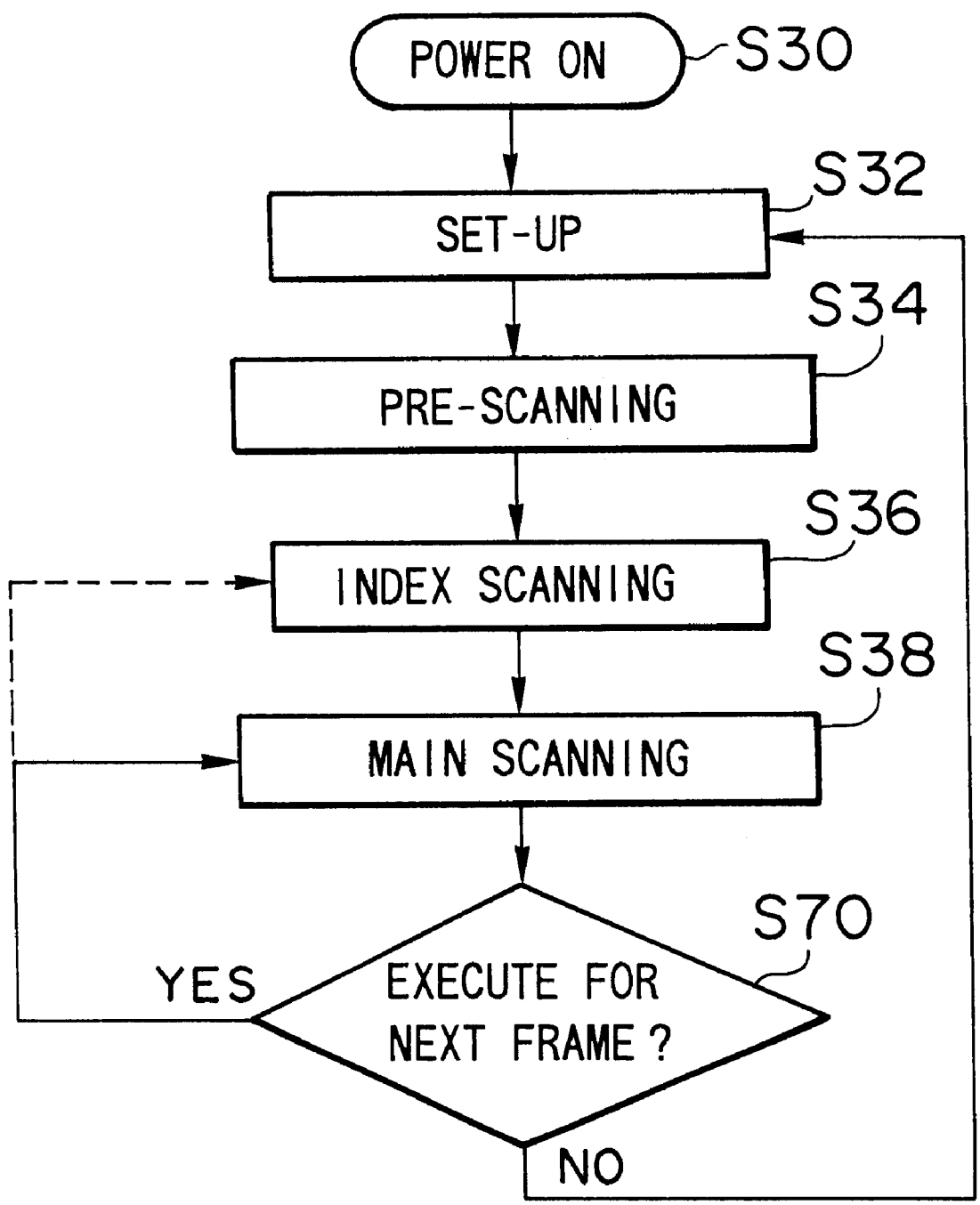
F I G. 7

FILM IMAGE CAPTURING METHOD

BACKGROUND OF THE INVENTION

1. Field of the Invention

The present invention relates generally to a film image capturing method, and more particularly to a film image capturing method of capturing frame images on a developed film with a line sensor.

2. Description of Related Art

Japanese Patent Provisional Publication No. 8-336071 discloses a conventional film image capturing method in which image data is captured with a line sensor from each of a plurality of frames on a continuous developed film, which is transported at a preset speed and is illuminated with a light source.

This film image capturing method includes the steps of performing a pre-scanning process for determining exposed conditions such as the brightness and white balance state of each frame before capturing fine image data from the frame, and performing a main scanning process for capturing fine image data from a desired frame under capturing conditions which are adjusted according to the exposed conditions of the desired frame determined in the pre-scanning process.

The method can include an index scanning process for capturing rough image data from each frame on the film under the capturing conditions which are adjusted according to the exposed conditions of each frame determined in the pre-scanning process, and thereby producing an index image showing the frames on the film. The index image, which is produced by the index scanning, is displayed on a screen of a TV monitor for example, and is used to interactively enter print order information with respect to each frame and information which is necessary for displaying a fine image of one frame at a time on the TV monitor, or the like.

The method can include a set-up process for capturing an image signal with the line sensor from a negative base area, which is not exposed at all, on the film, and adjusting a gain of an analog amplifier, etc. so that the image signal of the negative base area, which is output from the line sensor, can be a preset reference value.

A long time elapses before the intensity and spectral characteristics of light emitted from the light source (e.g. a fluorescent lamp) illuminating the film are stable after the light source is switched on. In the conventional image capturing method, the set-up process, the pre-scanning process and the index scanning process are performed after the light source reaches a predetermined stable state. For this reason, there is a problem in that the index image cannot be displayed rapidly, and thus, a variety of editing operations using the index image cannot be performed immediately.

There is another problem in that satisfactory image data cannot be captured if there are variations in the output level of the line sensor and/or the intensity of the light emitted from the light source.

SUMMARY OF THE INVENTION

The present invention has been developed in view of the above-described circumstances, and has as its object the provision of a film image capturing method which makes it possible for an index image to be displayed at an early stage, and is able to capture satisfactory image data even if there are variations in the output level of the line sensor and/or the intensity of light emitted from the light source.

To achieve the above-mentioned object, a film image capturing method of the present invention in which image data is captured with a line sensor from each of a plurality of frames on a continuous developed film being transported at a preset speed and being illuminated with a light source, comprises the steps of: pre-scanning for determining exposed conditions, including brightness, of each of the plurality of frames on the film; index scanning for capturing rough image data from each of the plurality of frames on the film under capturing conditions being adjusted according to the exposed conditions of the frame which are determined in the pre-scanning, and producing an index image showing all or selected frames of the plurality of frames on the film; main scanning for capturing fine image data from a desired frame of the plurality of frames on the film under the capturing conditions being adjusted according to the exposed conditions of the desired frame which are determined in at least one of the pre-scanning and the index scanning; and this method is characterized in that the index scanning is enabled before the light source reaches a predetermined stable state required for the main scanning, such that the producing of the index image is performed at an early stage.

According to the present invention, the index scanning is performed before the light source reaches the predetermined stable state required for the main scanning (for instance, when the intensity of light emitted from the light source reaches a preset level), since the rough image data captured in the index scanning can permit a lower picture quality than the fine image data captured in the main scanning. Thus, the index image can be displayed at an early stage.

To achieve the above-mentioned object, a film image capturing method of the present invention in which image data is captured with a line sensor from each of a plurality of frames on a continuous developed film being transported at a preset speed and being illuminated with a light source, comprises the steps of: pre-scanning for determining exposed conditions, including brightness, of each of the plurality of frames on the film; main scanning for capturing fine image data from a desired frame of the plurality of frames on the film under capturing conditions being adjusted according to the exposed conditions of the desired frame which are determined in the pre-scanning; and this method is characterized in that if a preset time elapses before performance of the main scanning after performance of the scanning for determining the exposed conditions of the desired frame, rescanning is performed for determining the exposed conditions of the desired frame, and the main scanning is performed under the capturing conditions being adjusted according to the exposed conditions of the desired frame which are determined in the rescanning.

According to another mode of the present invention, the rescanning is performed to determine the exposed conditions of a selected frame instead of the frame subject to the main scanning. The exposed conditions of each frame are corrected according to respective differences between the exposed conditions of the selected frame which are determined in the rescanning and the exposed conditions of the selected frame which are previously determined, and the main scanning is performed under the capturing conditions being adjusted according to the corrected exposed conditions of the desired frame.

To achieve the above-mentioned object, a film image capturing method of the present invention in which image data is captured with a line sensor from each of a plurality of frames on a continuous developed film being transported at a preset speed and being illuminated with a light source, comprises the steps of: performing a set-up step including capturing image data with the line sensor from a negative base area on the film, being illuminated with the light source, and adjusting capturing conditions so that the image data of the negative base area is preset reference data; pre-scanning for determining exposed conditions, including brightness, of each of the plurality of frames on the film; main scanning for capturing fine image data from a desired frame of the plurality of frames on the film under the capturing conditions being adjusted according to the exposed conditions of the desired frame which are determined in the pre-scanning; and performing the set-up step again, if a preset time elapses before performance of the main scanning after performance of the scanning for determining the exposed conditions of the desired frame.

According to another mode of the present invention, after the performance of the pre-scanning, the set-up step is repeatedly performed in intermission of the main scanning, instead of performing the set-up step again under the predetermined conditions.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a flow chart showing the first embodiment of the film image capturing method according to the present invention;

FIG. 4 is a flow chart showing the second embodiment of the film image capturing method according to the present invention;

FIG. 7 is a flow chart showing the fifth embodiment of the film image capturing method according to the present invention.

DETAILED DESCRIPTION OF THE PREFERRED EMBODIMENTS

This invention will be described in further detail by way of example with reference to the accompanying drawings.

Figure 1:
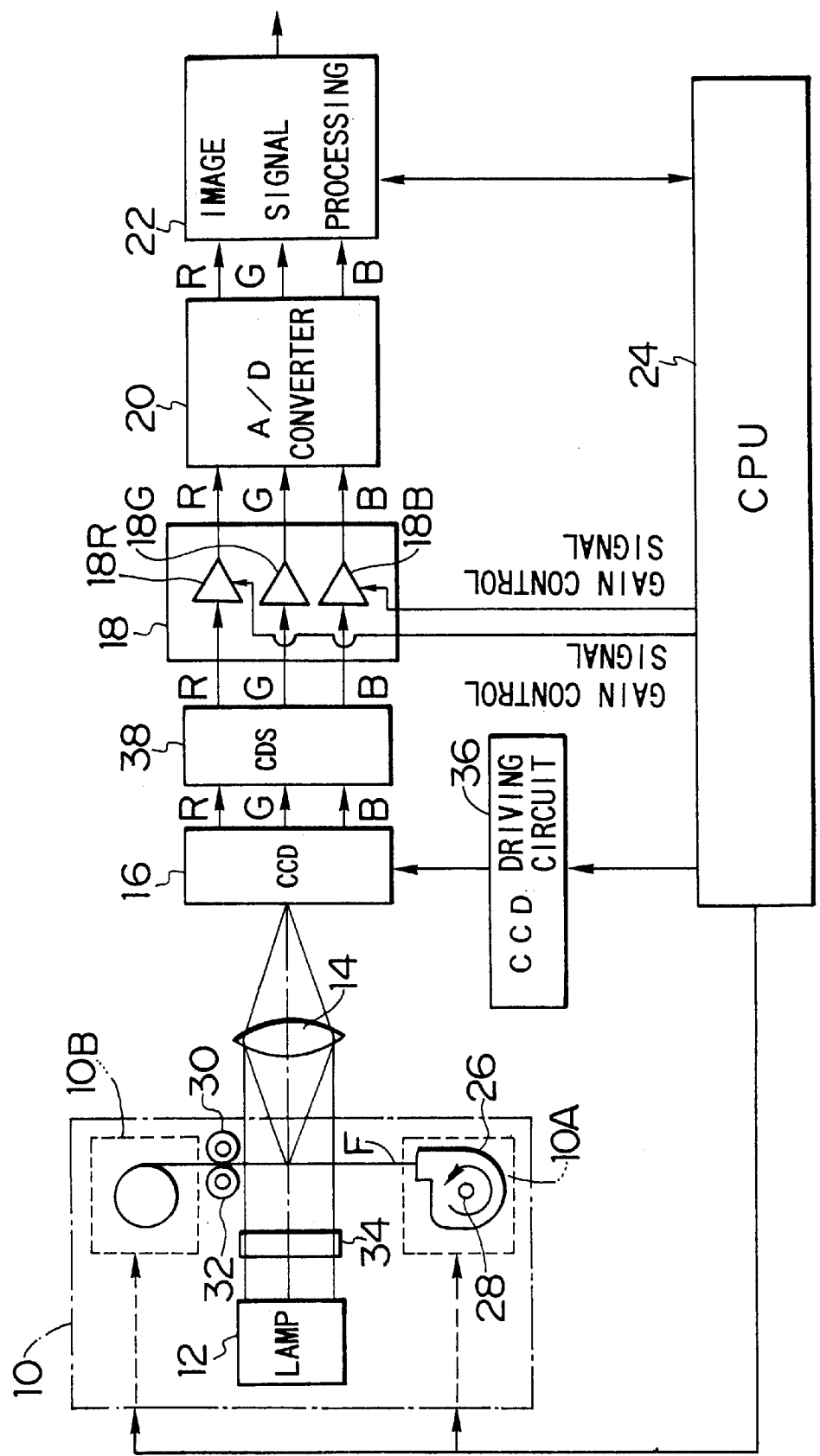
FIG. 1 is a block diagram showing the essential parts of a film scanner to which a film image capturing method of the present invention is applied.

FIG. 1 is a block diagram illustrating the essential parts of a film scanner to which a film image capturing method of the present invention is applied. This film scanner includes a film driving unit 10, which transports a developed photographic film F, an illumination light source 12, which is a fluorescent lamp, a taking lens 14, a CCD line sensor 16, an analog amplifier 18, an A/D converter 20, an image signal processing circuit 22, and a central processing unit (CPU) 24.

The film driving unit 10 comprises a film supply part 10A, which engages with a spool shaft 28 of a film cartridge 26 and drives the spool shaft 28 forward and backward, a film winding part 10B, which winds the film F fed from the film supply part 10A, and a mechanism, which is provided at a film passage and transports the film F at a proper speed while pinching the film F between a capstan 30 and a pinch roller 32, which are driven by a motor (not shown). When the film cartridge 26 is loaded, the film supply part 10A drives the spool shaft 28 of the film cartridge 26 counterclockwise in FIG. 1, and feeds the film F from the film cartridge 26 until the front end of the film F is wound by the film winding part 10B. The CPU 24 controls the film transport speed of the film driving unit 10. For instance, the film driving unit 10 continuously transports the film F at high speed during scanning for determining exposed conditions such as the brightness and white balance of all frames on the film F (hereinafter referred to as pre-scanning) and scanning for capturing rough image data from each frame to produce an index image composed of multiple frames on the film F (hereinafter referred to as index scanning). The film driving unit 10 transports the film F at low speed during scanning for capturing fine image data to display one frame or print (hereinafter referred to as main scanning).

The fluorescent lamp 12 illuminates the film F, which is pulled out of the film cartridge 26, through an infrared cutting filter 34, and the light which is transmitted through the film F is formed on a light accepting surface of the CCD line sensor 16 by the taking lens 14.

The CCD line sensor 16 is constructed in such a way that light accepting parts (photosensors) are arranged in a direction perpendicular to the film transporting direction. Image light which is formed on the light accepting surface of the CCD line sensor 16 is electrically charged at each light accepting part provided with a R, G or B filter, and the image light is converted into R, G and B signal electric charge according to the intensity of light. When a read gate pulse of one-line cycle is supplied from a CCD driving circuit 36, the accumulated R, G and B signal charge is transferred to a shift register, and is sequentially output as voltage signals by a register transfer pulse. In the CCD line sensor 16, a shutter gate and a shutter drain are provided adjacent to each light accepting part. The shutter gate pulse drives the shutter gate so that the accumulated charge can be discharged from the light accepting part into the shutter drain. In other words, the CCD line sensor 16 has a so-called electronic shutter function for controlling the charge in the light accepting parts in response to the shutter gate pulse supplied from the CCD driving circuit 36

On the other hand, the R, G and B voltage signals, which are output from the CCD line sensor 16, are held by a CDS cramp and transferred to amplifiers 18R, 18G, 18B of the analog amplifier 18. The gain of each of the R and B voltage signals which are transferred to the amplifiers 18R and 18B is controlled by a gain control signal which is output from the CPU 24. As described later, the gain of each channel is controlled so that a voltage of each signal which is input to the A/D converter 20 can be a proper value (proper voltage D) on a negative base area. This gain control will hereinafter be referred to as calibration.

Then, the A/D converter 20 converts the R, G and B voltage signals, which are output from the analog amplifier 18, into R, G and B digital signals. The digitized R, G and B signals are stored in an image memory after the image signal processing circuit 22 performs processing such as black correction, shading correction, white balance adjustment, negative-positive inversion and gamma correction.

In the black correction, a dark current component in the CCD line sensor 16 is eliminated by subtracting the black signal, which is obtained by shading the CCD line sensor 16, from the image signal. In the shading correction, the unevenness of sensitivity of picture elements in the CCD line sensor 16 is eliminated by correcting the image signal according to the shading signal, which is obtained in a state where there is no negative base. The processing for the calibration, the black correction and the shading correction will hereafter be referred to as a set-up process.

The digital signals of one frame, which are stored in the image memory in the image signal processing circuit 22 during the main scanning, are read repeatedly. The read signals are converted into NTSC composite video signals or R, G and B signals for digital printing, and are output.

Figure 2:
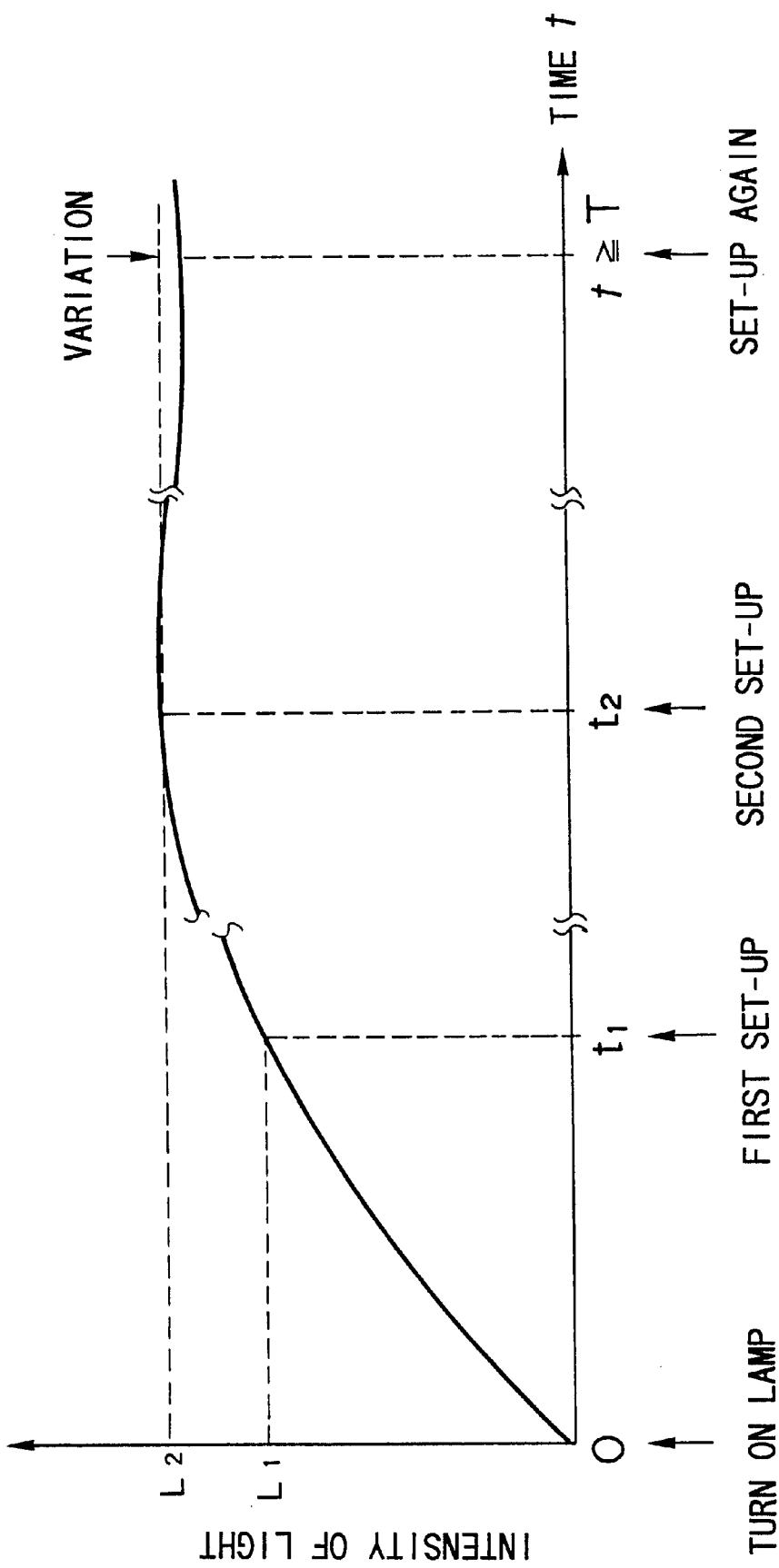
FIG. 2 is a graph showing variation in the intensity of light emitted from a light source for assistance in explaining the present invention.

A description will hereunder be given of the first embodiment of the film image capturing method according to the present invention with reference to FIGS. 2 and 3.

As shown in FIG. 3, after the film scanner is turned on to light the fluorescent lamp 12 (S10), the intensity of light emitted from the fluorescent lamp 12 gradually increases as time t passes as shown in FIG. 2. At the time $t_1$ when the CPU 24 detects that the intensity of light emitted from the fluorescent lamp 12 has reached a preset level $L_1$ in accordance with one particular signal among the R, G and B signals, which are input to the image signal processing circuit 22, or a luminance signal, which is produced according to the R, G and B signals, the CPU 24 performs the first set-up (S12). If the intensity of light emitted from the fluorescent lamp 12 is at the preset level $L_1$, image data can be captured to produce the index image. The preset level $L_1$ is lower than the level $L_2$ where the light has reached a predetermined stable state required for main scanning.

After the first set-up, the CPU 24 performs the first pre-scanning and the index scanning (S14 and S16). In the first pre-scanning, the CPU 24 continuously transports the film F at high speed, and determines the exposed conditions such as the brightness and white balance of all frames on the film F in accordance with the rough image data of each frame on the film F captured with the CCD line sensor 16. In the index scanning, the CPU 24 captures rough image data from each frame on the film F with the exposure control by the electronic shutter, etc. being performed for each frame according to the exposed conditions of each frame which are determined in the first pre-scanning, and produces the index image showing all frames on the film F.

After the index scanning, the index image is displayed on a screen of a TV monitor, or the like. In the film scanner, it is possible to enter print order information about each frame, information necessary for displaying one frame at a time on the screen of the TV monitor, etc. by manipulation of operation keys (not shown) while viewing the index image.

Next, the CPU 24 reads the negative base area on the film F in order to perform the second set-up. When the R, G and B signals or the luminance signal captured on the negative base area stops varying its level, the fluorescent lamp 12 is regarded as having reached the stable state. Then, at the time $t_2$ when the fluorescent lamp 12 reaches the stable state as shown in FIG. 2, the second set-up is performed (S18), and the second pre-scanning is performed (S20).

Thereafter, to perform the main scanning at S22, the exposure control, etc. is performed for a frame which is subject of the main scanning according to the exposed conditions of the frame which are determined in the second pre-scanning, and fine image data of the frame is captured. Then, it is decided whether the main scanning will be performed or not for the next frame (S24). If the main scanning is performed for the next frame, the capturing conditions are adjusted for the next frame according to the exposed conditions of the next frame determined in the second pre-scanning in the same manner as S22, and fine image data of the next frame is captured. If the main scanning is not performed for the next frame, that is, if the power is turned off or the film cartridge 26 is picked out, the processing terminates.

A description will be given of the second embodiment of the film image capturing method according to the present invention with reference to FIGS. 2 and 4.

As shown in FIG. 4, the film scanner is turned on to light the fluorescent lamp 12 (S30). The set-up is performed at the time $t_2$ when the fluorescent lamp 12 reaches the stable state as shown in FIG. 2 (S32), and then, the pre-scanning and the index scanning are performed (S34 and S36). In the index scanning, the film scanner captures rough image data from each frame on the film F with the exposure control by the electronic shutter, etc. being performed for each frame according to the exposed conditions of each frame which are determined in the pre-scanning, and produces an index image showing all frames on the film F. Only the rough image data of a selected frame, which is subject of the main scanning, may be captured in the index scanning.

Thereafter, to perform the main scanning at S38, the exposure control, etc. is performed for a frame which is subject of the main scanning according to the exposed conditions determined in the pre-scanning, and fine image data is captured from the frame. Then, it is decided whether the main scanning will be performed or not for the next frame (S40). If it is decided that the main scanning will be not performed for the next frame, the processing terminates. On the other hand, if it is decided that the main scanning will be performed for the next frame, the processing goes onto S42. At S42, it is decided whether a preset time T (in which there may be variation in the output level of the CCD line sensor 16 and/or the intensity of light emitted form the fluorescent lamp 12) has already elapsed or not since the performance of the set-up at $t_2$. If the preset time T has not elapsed yet (i.e. t<T) and the index scanning was performed for all frames at S36, the main scanning is performed for the next frame. If the preset time T has not elapsed yet and the index scanning was only performed for the selected frame at S36, the index scanning is performed for the next selected frame (the next frame) as indicated with a broken line in FIG. 4, and the main scanning is performed for the next frame.

On the other hand, if the preset time T has already elapsed (i.e. t≧T), there is such a possibility that the intensity of light emitted from the fluorescent lamp 12 has varied as shown in FIG. 2. Hence, the processing returns to S32 to perform the set-up again, or to S34 to perform the pre-scanning again. Thus, the main scanning can be properly performed, even if there is a variation in the intensity of light emitted from the fluorescent lamp 12, etc. If the set-up or the pre-scanning is performed again, a timer counter measuring time t is reset. Both the set-up and the pre-scanning may be performed again.

Figure 5:
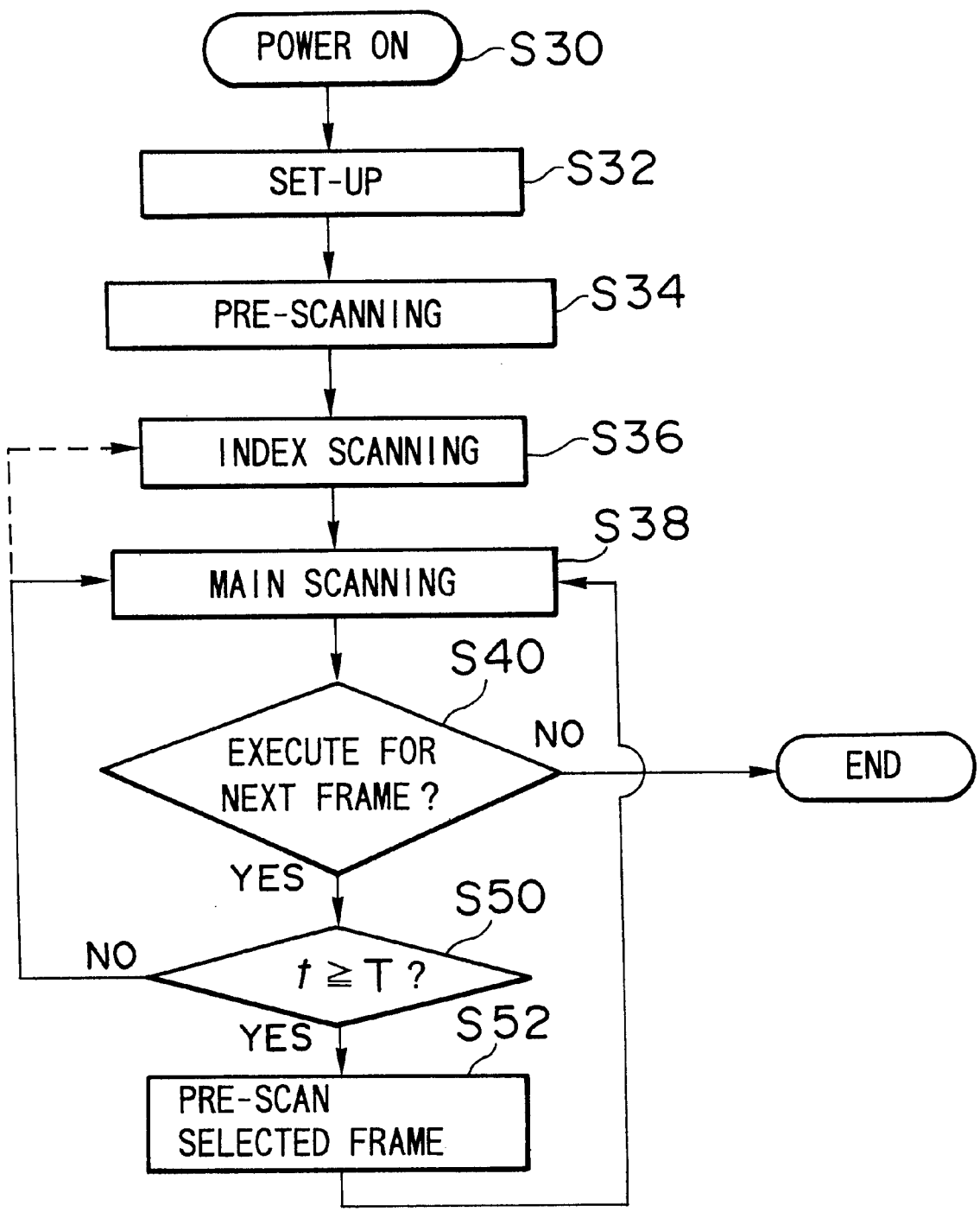
FIG. 5 is a flow chart showing the third embodiment of the film image capturing method according to the present invention.

FIG. 5 is a flow chart showing the third embodiment of the film image capturing method according to the present invention. Processes similar to those of the second embodiment described with reference to FIG. 4 are denoted by the same reference numerals, and a detailed description will not be given of them.

The third embodiment in FIG. 5 is different from the second embodiment in the processing which is performed when it is decided at S50 that the preset time T has already elapsed. In other words, in the case of t≧T, the pre-scanning is performed for the selected frame (S52), and the main scanning is performed at S38 to capture fine image data from the selected frame in accordance with the exposed conditions of the selected frame determined in the pre-scanning at S52. In this embodiment, the timer counter measuring time t is not reset.

Figure 6:
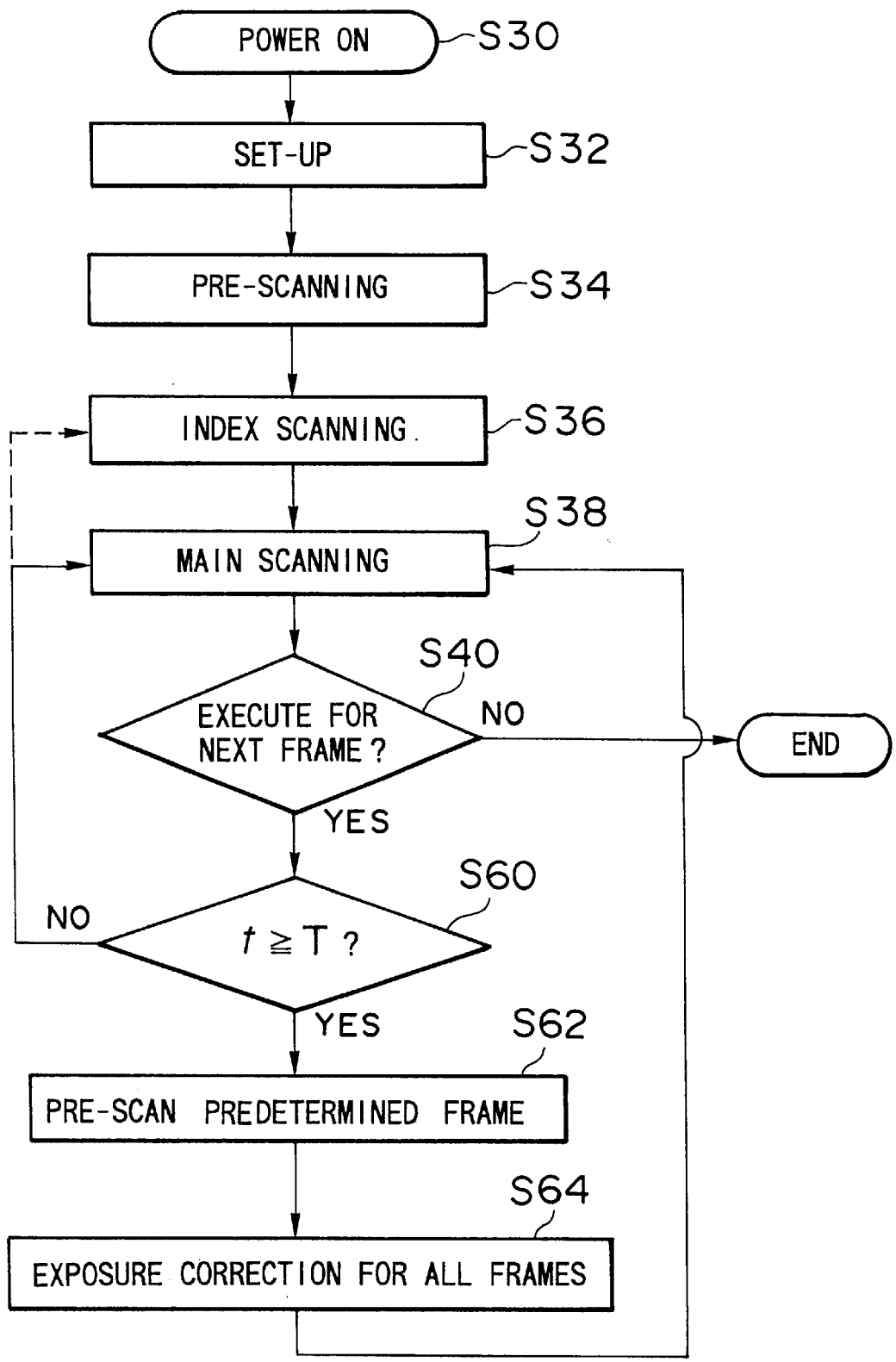
FIG. 6 is a flow chart showing the fourth embodiment of the film image capturing method according to the present invention.

FIG. 6 is a flow chart showing the fourth embodiment of the film image capturing method according to the present invention. Processes similar to those of the second embodiment described with reference to FIG. 4 are denoted by the same reference numerals, and a detailed description will not be given of them.

The fourth embodiment in FIG. 6 is different from the second embodiment in the processing which is performed when it is decided at S60 that the preset time T has already elapsed. In other words, in the case of t≧T, the pre-scanning is performed for a predetermined frame, which may be a selected frame, and its exposed conditions are determined (S62). For the predetermined frame, the exposed conditions which are determined at S62 are compared with the exposed conditions which were determined in the pre-scanning at S34. Then, the exposed conditions of all frames are updated according to the variation in the determined exposed conditions (S64). At S38, the main scanning is performed to capture fine image data from the next frame in accordance with the exposed conditions of the next frame, which have been updated as stated above. In this embodiment, the timer counter measuring the time t is reset.

FIG. 7 is a flow chart showing the fifth embodiment of the film image capturing method according to the present invention. Processes similar to those of the second embodiment described with reference to FIG. 4 are denoted by the same reference numerals, and a detailed description will not be given of them.

The fifth embodiment in FIG. 7 is different from the second embodiment in the processing from S70. In other words, it is decided at S70 whether the main scanning will be performed or not for the next frame. If it is decided that the main scanning will be performed for the next frame, the main scanning is performed for the next frame at S38. On the other hand, if it is decided that the main scanning will not be performed for the next frame, the processing returns to S32, where the set-up is performed in such a way that the film F is transported so that the negative base area on the film F can be read. Thus, the set-up is repeatedly performed in intermission of the main scanning.

The present invention should not be restricted to the above-described embodiments, and a plurality of embodiments may appropriately be combined. The exposed conditions may be determined again in accordance with the image data captured in the index scanning, and the main scanning may be performed in accordance with the exposed conditions which are determined in the index scanning.

As set forth hereinabove, according to the film image capturing method of the present invention, the index scanning is performed before the light source reaches the predetermined stable state required for the main scanning, so that the index image can be displayed at an early stage. Hence, a variety of editing can be performed using the index image until the light source reaches the predetermined stable state. Since the set-up and the pre-scanning are performed again after the light source reaches the stable stage, satisfactory image data can be captured in the main scanning.

According to the present invention, if a preset time has elapsed since the set-up and the pre-scanning were performed until the main scanning is performed, the set-up and the pre-scanning are performed again. If the main scanning is not performed, the set-up may be regularly performed. For this reason, satisfactory image data can be captured even if there are variations in the output level of the line sensor and/or the intensity of light emitted from the light source.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film image capturing method wherein image data is captured with a line sensor from each of a plurality of frames on a continuous developed film being transported at a preset speed and being illuminated with a light source, comprising:

pre-scanning for determining exposed conditions of each of the plurality of frames on the film;

index scanning for capturing rough image data from each of the plurality of frames on the film, wherein capturing conditions for each rough image data are adjusted according to the exposed conditions of the frame, and for producing an index image showing all or selected frames of the plurality of frames on the film; and main scanning capturing fine image data from a desired frame of the plurality of frames on the film, wherein capturing conditions for each fine image data is adjusted according to the exposed conditions of the desired frame;

wherein the index scanning is enabled before said light source reaches a predetermined stable state required for the main scanning such that the producing of the index image is performed at an early stage; and wherein, if the index scanning is performed before said light source reaches the stable state, then rescanning is performed for determining the exposed conditions of each frame or the desired frame of the plurality of frames on the film after said light source reaches the stable state, and the main scanning is performed wherein capturing conditions for each fine image data are adjusted according to the exposed conditions of the desired frame.

2. The film image capturing method as defined in claim 1, further comprising the step of:

performing a set-up step including capturing image data with said line sensor from a negative base area on the film, being illuminated with said light source, and adjusting the capturing conditions so that the image data of the negative base area is preset reference data, before the pre-scanning.

3. The film image capturing method as defined in claim 2, wherein if the index scanning is performed before said light source reaches the stable state, the set-up step is performed again after said light source reaches the stable state.

4. The film image capturing method as defined in claim 2, wherein if the index scanning is performed before said light source reaches the stable state, the set-up step is performed again after said light source reaches the stable state, rescanning is performed for determining the exposed conditions of each frame or the desired frame of the plurality of frames on the film, and the main scanning is performed wherein capturing conditions for each fine image data are adjusted according to the exposed conditions of the desired frame.

5. A film image capturing method wherein image data is captured with a line sensor from each of a plurality of frames on a continuous developed film being transported at a preset speed and being illuminated with a light source, comprising:

pre-scanning for determining exposed conditions of each of the plurality of frames on the film;

main scanning capturing fine image data from a desired frame of the plurality of frames on the film, wherein capturing conditions for each fine image data are adjusted according to the exposed conditions of the desired frame; and wherein if a preset time elapses before performance of the main scanning step above, rescanning is performed for determining the exposed conditions of the desired frame, and the main scanning is performed, wherein capturing conditions for each fine image data are adjusted according to the exposed conditions of the desired frame.

6. A film image capturing method wherein image data is captured with a line sensor from each of a plurality of frames on a continuous developed film being transported at a preset speed and being illuminated with a light source, comprising:

pre-scanning for determining exposed conditions of each of the plurality of frames on the film;

main scanning capturing fine image data from a desired frame of the plurality of frames on the film, wherein capturing conditions for each fine image data are adjusted according to the exposed conditions of the desired frame; and wherein if a preset time elapses before performance of the main scanning step above, rescanning is performed for determining the exposed conditions of a selected frame of the plurality of frames on the film, the exposed conditions of each of the plurality of frames on the film are corrected according to respective differences between the exposed conditions of the selected frame determined during the rescanning and the exposed conditions of the selected frame determined during the pre-scanning, and the main scanning is performed, wherein capturing conditions for each fine image data is adjusted according to the corrected exposed conditions of the desired frame.

7. A film image capturing method wherein image data is captured with a line sensor from each of a plurality of frames on a continuous developed film being transported at a preset speed and being illuminated with a light source, comprising:

performing a set-up step including capturing image data with said line sensor from a negative base area on the film, being illuminated with said light source, and adjusting capturing conditions so that the image data of the negative base area is preset reference data;

pre-scanning for determining exposed conditions of each of the plurality of frames on the film;

main scanning capturing fine image data from a desired frame of the plurality of frames on the film, wherein capturing conditions for each fine image data are adjusted according to the exposed conditions of the desired frame; and performing the set-up again, if after the pre-secanning is performed, a preset time elapses before performance of the main scanning.

8. The film image capturing method as defined in claim 7, wherein if the the set-up process is performed again, rescanning is performed for determining the exposed conditions of the desired frame, and the main scanning is performed, wherein capturing conditions for each fine image data are adjusted according to the exposed conditions of the desired frame.

9. A film image capturing method wherein image data is captured with a line sensor from each of a plurality of frames on a continuous developed film being transported at a preset speed and being illuminated with a light source, comprising:

performing a set-up step including capturing image data with said line sensor from a negative base area on the film, being illuminated with said light source, and adjusting capturing conditions so that the image data of the negative base area is preset reference data;

pre-scanning for determining exposed conditions, of each of the plurality of frames on the film;

main scanning capturing fine image data from a desired frame of the plurality of frames on the film, wherein capturing conditions for each fine image data are adjusted according to the exposed conditions of the desired frame; and wherein the set-up step is repeatedly performed when the main scanning is not being performed after the pre-scanning.

10. A film image capturing method capturing images on frames of a developed film being transported at a preset speed and illuminated with a light source, comprising:

a) index scanning to capture rough images of said frames when said light source reaches a first intensity level wherein said first intensity level is reached before a stable intensity level;

c) pre-scanning to determine exposed conditions for each frame when said light source reaches said stable intensity level;

c) main scanning to capture fine image data of said each frame based on said exposed condition for said each frame.

11. The method of claim 10, further comprising:

d) processing a set-up to perform calibration, black correction, and shading correction prior to said step a).

12. The method of claim 10, further comprising:

d) first pre-scanning, prior to step a), to determine said exposed conditions for said each frame before said light source reaches said stable intensity level.

13. The method of claim 10, further comprising:

d) a set-up to perform calibration, black correction, and shading correction prior to said step c).

14. A film image capturing method capturing images on frames of a developed film being transported at a preset speed and illuminated with a light source, comprising:

a) processing a set-up to perform calibration, black correction, and shading correction prior to said pre-scanning;

b) pre-scanning to determine exposed conditions for said frames;

c) index scanning to capture rough image of said frames;

d) main scanning to capture fine image data of a current frame based on said exposed conditions of said current frame;

e) determining if a next frame should be main scanned;

f) determining if a predetermined amount of time has passed since said step b) if it is determined in step e) that said next frame should be main scanned, wherein said predetermined amount of time represents an amount of time beyond which basing a main scanning on said exposed conditions of said current frame would be suspect due to the fluctuations in light intensity of said source light over time; and g) pre-scanning to revise said exposed conditions of frames not yet main scanned if said predetermined amount of time has passed.

15. The method of claim 14, further comprising:
   h) repeating said step a) if said predetermined amount of time has passed.

16. The method of claim 14, further comprising:
   h) repeating step d) for said next frame if said predetermined amount of time has not passed.

17. A film image capturing method capturing images on frames of a developed film being transported at a preset speed and illuminated with a light source, comprising:
   a) processing a set-up to perform calibration, black correction, and shading correction prior to said pre-scanning;
   b) pre-scanning to determine exposed conditions of said all frames;
   c) index scanning to capture rough image of a current frame;
   d) main scanning to capture fine image data of said current frame based on said exposed condition for said current frame;
   e) determining if a next frame should be main scanned;
   f) determining if a predetermined amount of time has passed since said step b) if it is determined in step e) that said next frame should be main scanned, wherein said predetermined amount of time represents an amount of time beyond which basing a main scanning on said exposed conditions of said current frame would be suspect due to the fluctuations in light intensity of said source light over time; and
   g) pre-scanning to revise said exposed conditions of said current frame and main scanning to capture fine image data of said current frame based on said revised exposed conditions for said current frame if said predetermined amount of time has passed.

18. The method of claim 18, further comprising:
   h) repeating said index scanning step to capture rough image of said next frame if said predetermined amount of time has not passed.

19. A film image capturing method capturing images on frames of a developed film being transported at a preset speed and illuminated with a light source, comprising:
   a) processing a set-up to perform calibration, black correction, and shading correction prior to said pre-scanning;
   b) pre-scanning to determine exposed conditions of said all frames;
   c) index scanning to capture rough image of said all frames;
   d) main scanning to capture fine image data of a current frame based on said exposed condition for said current frame;
   e) determining if a next frame should be main scanned;
   f) determining if a predetermined amount of time has passed since said step b) if it is determined in step e) that said next frame should be main scanned, wherein said predetermined amount of time represents an amount of time beyond which basing a main scanning on said exposed conditions of said current frame would be suspect due to the fluctuations in light intensity of said source light over time; and
   g) pre-scanning to revise exposed conditions of a predetermined frame, updating said exposed conditions of all frames based on said revised exposed conditions of said predetermined frame, and main scanning to capture fine image data of said next frame based on said updated exposed conditions for said next frame if said predetermined amount of time has passed.

20. The method of claim 19, further comprising:
   h) main scanning step for said next frame to capture fine image data of said next frame based on said exposed condition for said next frame if said predetermined amount of time has not passed.

* * * * *